US012606679B2

(12) United States Patent
Hashiguchi et al.

(10) Patent No.: US 12,606,679 B2
(45) Date of Patent: Apr. 21, 2026

(54) POLYHYDROXYALKANOATE RESIN COMPOSITION, MOLDED BODY OF THE SAME, AND FILM OR SHEET OF THE SAME

(71) Applicant: KANEKA CORPORATION, Osaka (JP)

(72) Inventors: Tomoaki Hashiguchi, Settsu (JP); Shunsuke Sato, Takasago (JP)

(73) Assignee: KANEKA CORPORATION, Osaka (JP)

( * ) Notice: Subject to any disclaimer, the term of this patent is extended or adjusted under 35 U.S.C. 154(b) by 697 days.

(21) Appl. No.: 17/480,335

(22) Filed: Sep. 21, 2021

(65) Prior Publication Data

US 2022/0041823 A1    Feb. 10, 2022

Related U.S. Application Data

(63) Continuation of application No. PCT/JP2020/008440, filed on Feb. 28, 2020.

(30) Foreign Application Priority Data

Mar. 28, 2019    (JP) .................................. 2019-062424

(51) Int. Cl.
*C08L 67/04*    (2006.01)
*C08J 5/18*    (2006.01)
*C08K 3/36*    (2006.01)

(52) U.S. Cl.
CPC ................. *C08J 5/18* (2013.01); *C08L 67/04* (2013.01); *C08J 2367/04* (2013.01);
(Continued)

(58) Field of Classification Search
CPC ... C08L 2205/02; C08L 2666/18; C08L 67/04
See application file for complete search history.

(56) References Cited

U.S. PATENT DOCUMENTS 7,754,826 B1    7/2010 Smith, Jr. et al.
8,822,584 B2 *  9/2014 Whitehouse ......... C08K 5/0083
                                         524/425
(Continued)

FOREIGN PATENT DOCUMENTS

JP        2004-161802 A      6/2004
JP        2004-331757 A      11/2004
(Continued)

OTHER PUBLICATIONS

Zheng et al., "Effects of crystallization of polyhydroxyalkanoate blend on surface physicochemical properties and interactions with rabbit articular cartilage chondrocytes", Biomaterials, 2005, vol. 26, pp. 3537-3548.
(Continued)

*Primary Examiner* — Maria V Ewald
*Assistant Examiner* — Daniel P Dillon
(74) *Attorney, Agent, or Firm* — Oblon, McClelland, Maier & Neustadt, L.L.P.

(57) ABSTRACT

Provided is a polyhydroxyalkanoate resin composition containing a polyhydroxyalkanoate resin component. In differential scanning calorimetry of the resin composition, a highest melting peak temperature is 130° C. or higher, and a total crystalline melting enthalpy calculated from all melting peaks is in the range of 20 to 65 J/g. Preferably, the polyhydroxyalkanoate resin component is a mixture of at least two polyhydroxyalkanoate resins differing in crystalline melting enthalpy.

15 Claims, 1 Drawing Sheet

Exo Up

(52) U.S. Cl.
CPC ....... *C08J 2467/04* (2013.01); *C08L 2203/16*
(2013.01); *C08L 2205/025* (2013.01); *C08L*
*2205/03* (2013.01)

(56) References Cited

U.S. PATENT DOCUMENTS

| | | | |
|---|---|---|---|
| 2004/0213941 A1 | 10/2004 | Whitehouse | |
| 2013/0017583 A1* | 1/2013 | Budde ...................... | C12N 9/88 |
| | | | 435/254.11 |
| 2014/0005620 A1* | 1/2014 | Wang ...................... | B29C 48/49 |
| | | | 428/220 |
| 2015/0232660 A1* | 8/2015 | Okura .................... | C08K 13/02 |
| | | | 524/317 |
| 2020/0017641 A1 | 1/2020 | Koyama | |

FOREIGN PATENT DOCUMENTS

| | | |
|---|---|---|
| JP | 2006-518799 A | 8/2006 |
| JP | 2008-223002 A | 9/2008 |
| JP | 2011-140656 A | 7/2011 |
| WO | WO 2008/018567 A1 | 2/2008 |
| WO | WO 2018/181500 A1 | 10/2018 |

OTHER PUBLICATIONS

Koyama et al., "Miscibility of binary blends of poly[(R)-3-hydroxybutyric acid] and poly[(S)-lactic acid]", Polymer, 1997, vol. 38, No. 7, pp. 1589-1593.
International Search Report dated May 19, 2020, in PCT/JP2020/008440, filed Feb. 28, 2020.

* cited by examiner

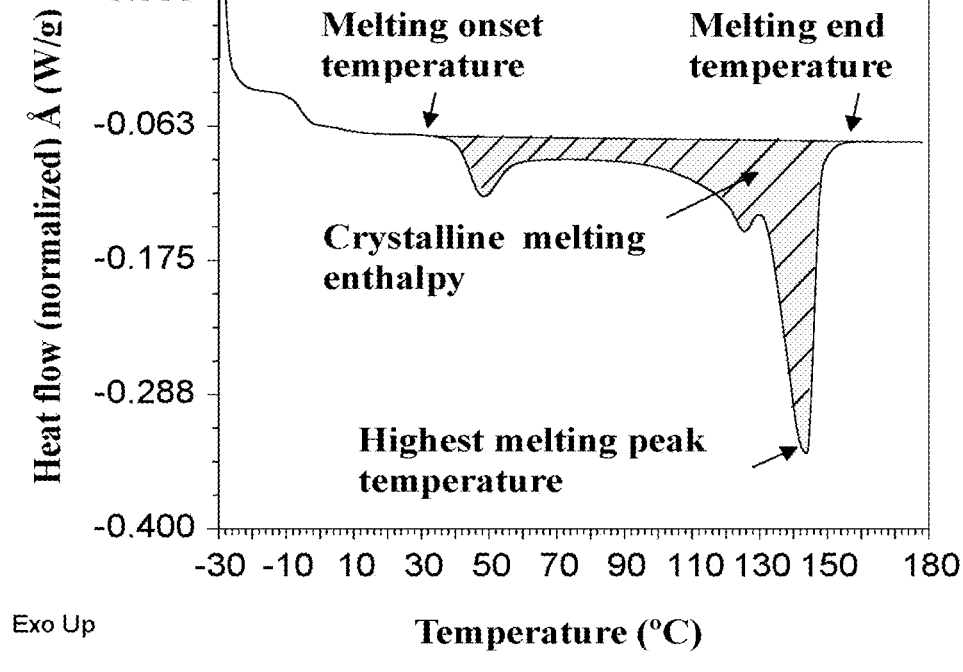

POLYHYDROXYALKANOATE RESIN COMPOSITION, MOLDED BODY OF THE SAME, AND FILM OR SHEET OF THE SAME

CROSS REFERENCE TO RELATED APPLICATIONS

This application is a continuation of International Application No. PCT/JP2020/008440, filed Feb. 28, 2020, and claims priority to Japanese Application No. 2019-062424, filed Mar. 28, 2019, the disclosures of all of which are incorporated herein by reference in their entireties.

TECHNICAL FIELD

The present invention relates to a polyhydroxyalkanoate resin composition, a molded body of the composition, and a film or sheet of the composition.

BACKGROUND ART

A huge amount of petroleum-based plastics are discarded as waste every year. The huge amount of waste plastics have brought about the problems of a shortage of landfill sites and environmental pollution, and these problems have become a serious concern. Additionally, in recent years, microplastics have caused significant harm to the marine environment.

Polyhydroxyalkanoate resins are highly degradable in seawater and promising as a solution to the environmental problems induced by plastics discarded as waste. For example, poly(3-hydroxybutyrate-co-3-hydroxyhexanoate) is a poly(3-hydroxybutyrate) copolymer resin, and the processing properties and mechanical properties of this resin can be flexibly controlled by changing the proportion of 3-hydroxyhexanoate.

However, increasing the proportion of 3-hydroxyhexanoate tends to deteriorate the processing properties, although the increased proportion of 3-hydroxyhexanoate leads to a decrease in crystallinity and hence an improvement in mechanical properties. To achieve high tearing resistance and high toughness required of a molded body such as a film, the proportion of 3-hydroxyhexanoate needs to be increased to such a degree that the processing becomes extremely difficult. This makes it hard to obtain a molded body having satisfactory levels of both processability and mechanical properties by using poly(3-hydroxybutyrate-co-3-hydroxyhexanoate).

Patent Literature 1 teaches that blending poly(3-hydroxybutyrate-co-3-hydroxyhexanoate) with polybutylene adipate terephthalate improves the processability in inflation molding and the mechanical properties of the resulting film.

CITATION LIST

Patent Literature

PTL 1: WO 2018/181500

SUMMARY OF INVENTION

Technical Problem

In Patent Literature 1, poly(3-hydroxybutyrate-co-3-hydroxyhexanoate), which is a polyhydroxyalkanoate resin, is blended with polybutylene adipate terephthalate. However, polybutylene adipate terephthalate is not degradable in seawater and has low environmental degradability. Naturally, the resulting blend has low environmental degradability. As such, it is desired to achieve high processability and good mechanical properties without adding polybutylene adipate terephthalate.

In view of the above circumstances, the present invention aims to provide a polyhydroxyalkanoate resin composition containing a polyhydroxyalkanoate resin degradable in seawater, the composition having both high processability and good mechanical properties.

Solution to Problem

As a result of intensive studies with the goal of solving the above problems, the present inventors have found that when a composition containing a polyhydroxyalkanoate resin component is composed so that in differential scanning calorimetry of the composition, the highest melting peak temperature is 130° C. or higher and that the total crystalline melting enthalpy calculated from all melting peaks falls within a predetermined range, the polyhydroxyalkanoate resin composition can have both high processability and good mechanical properties. Based on this finding, the inventors have completed the present invention.

Specifically, the present invention is directed to the following.

[1] A polyhydroxyalkanoate resin composition containing a polyhydroxyalkanoate resin component, wherein in differential scanning calorimetry of the resin composition, a highest melting peak temperature is 130° C. or higher, and a total crystalline melting enthalpy calculated from all melting peaks is in the range of 20 to 65 J/g.

[2] The polyhydroxyalkanoate resin composition according to [1], wherein the polyhydroxyalkanoate resin component is a mixture of at least two polyhydroxyalkanoate resins differing in crystalline melting enthalpy.

[3] The polyhydroxyalkanoate resin composition according to [1] or [2], wherein the polyhydroxyalkanoate resin component includes poly(3-hydroxybutyrate-co-3-hydroxyhexanoate).

[4] The polyhydroxyalkanoate resin composition according to [3], wherein the polyhydroxyalkanoate resin component is a mixture of poly(3-hydroxybutyrate-co-3-hydroxyhexanoate) (A) containing 1 to 6 mol % of 3-hydroxyhexanoate structural units and poly(3-hydroxybutyrate-co-3-hydroxyhexanoate) (B) containing 24 mol % or more of 3-hydroxyhexanoate structural units.

[5] The polyhydroxyalkanoate resin composition according to [4], wherein in the mixture, the proportion of the poly(3-hydroxybutyrate-co-3-hydroxyhexanoate) (A) is 35% by weight or more, and the proportion of the poly(3-hydroxybutyrate-co-3-hydroxyhexanoate) (B) is 65% by weight or less.

[6] The polyhydroxyalkanoate resin composition according to any one of [1] to [5], further containing 1 to 12 parts by weight of silica per 100 parts by weight of the total amount of the polyhydroxyalkanoate resin component.

[7] The polyhydroxyalkanoate resin composition according to [6], further containing 0.1 to 20 parts by weight of a dispersion aid per 100 parts by weight of the total amount of the polyhydroxyalkanoate resin component.

[8] A polyhydroxyalkanoate resin molded body including the polyhydroxyalkanoate resin composition according to any one of [1] to [7].

[9] A polyhydroxyalkanoate resin film or sheet including the polyhydroxyalkanoate resin composition according to any one of [1] to [7].

Advantageous Effects of Invention

The present invention can provide a polyhydroxyalkanoate resin composition containing a polyhydroxyalkanoate resin degradable in seawater, the composition having both high processability and good mechanical properties. The polyhydroxyalkanoate resin composition according to the present invention is a material that can serve as a solution to plastics-induced environmental problems which have become a significant concern in resent years.

BRIEF DESCRIPTION OF DRAWINGS

The FIGURE is a graph showing a DSC curve of a polyhydroxyalkanoate resin composition obtained in Example 4 and showing a melting peak temperature and crystalline melting enthalpy which are calculated based on the DSC curve.

DESCRIPTION OF EMBODIMENTS

Hereinafter, embodiments of the present invention will be described. The present invention is not limited to the embodiments described below.

[Polyhydroxyalkanoate Resin Composition]

The polyhydroxyalkanoate resin composition of the present invention exhibits a highest melting peak temperature of 130° C. or higher and a total crystalline melting enthalpy, calculated from all melting peaks, of 20 to 65 J/g in differential scanning calorimetry. The composition contains a polyhydroxyalkanoate resin component including at least one polyhydroxyalkanoate resin, and may further contain components other than the resin component.

(Polyhydroxyalkanoate Resin Component)

The polyhydroxyalkanoate resin component, which is a main component of the polyhydroxyalkanoate resin composition of the present invention, may consist of a single polyhydroxyalkanoate resin or include a combination of two or more polyhydroxyalkanoate resins. Examples of the polyhydroxyalkanoate resin include a polymer containing 3-hydroxyalkanoate structural units (monomer units) and/or 4-hydroxyalkanoate structural units which are degradable in seawater. In particular, a polymer containing 3-hydroxyalkanoate structural units is preferred. Specifically, a polymer containing structural units represented by the following formula (1) is preferred.

$$[-CHR-CH_2-CO-O-] \quad (1)$$

In the formula (1), R is an alkyl group represented by $C_pH_{2p+1}$ and p is an integer from 1 to 15. Examples of R include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

The polyhydroxyalkanoate resin is particularly preferably a microbially produced polyhydroxyalkanoate resin. In the microbially produced polyhydroxyalkanoate resin, the 3-hydroxyalkanoate structural units contained are all (R)-3-hydroxyalkanoate structural units.

In the polyhydroxyalkanoate resin, the content of the 3-hydroxyalkanoate structural units (in particular, the structural units represented by the formula (1)) is preferably 50 mol % or more, more preferably 60 mol % or more, or even more preferably 70 mol % or more of total structural units. The structural units contained in the polyhydroxyalkanoate resin may consist solely of one or more kinds of 3-hydroxyalkanoate structural units or may include other structural units (e.g., 4-hydroxyalkanoate structural units) in addition to the 3-hydroxyalkanoate structural units.

The polyhydroxyalkanoate resin preferably contains 3-hydroxybutyrate (sometimes referred to as "3HB" hereinafter) structural units. In particular, all the 3-hydroxybutyrate structural units are preferably (R)-3-hydroxybutyrate structural units.

Specific examples of the polyhydroxyalkanoate resin include poly(3-hydroxybutyrate), poly(3-hydroxybutyrate-co-3-hydroxypropionate), poly(3-hydroxybutyrate-co-3-hydroxyvalerate) (abbreviated as P3HB3HV), poly(3-hydroxybutyrate-co-3-hydroxyvalerate-3-hydroxyhexanoate), poly(3-hydroxybutyrate-co-3-hydroxyhexanoate) (abbreviated as P3HB3HH), poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) (abbreviated as P3HB4HB). In particular, poly(3-hydroxybutyrate-co-3-hydroxyhexanoate) and poly(3-hydroxybutyrate-co-4-hydroxybutyrate) are preferred in terms of processability and mechanical properties.

In the case where the polyhydroxyalkanoate resin component of the polyhydroxyalkanoate resin composition of the present invention includes a resin containing 3-hydroxybutyrate structural units, an average content ratio between the 3-hydroxybutyrate units and the other monomer units (3-hydroxybutyrate units/other monomer units) in the total polyhydroxyalkanoate resin component is preferably from 97/3 to 70/30 (mol %/mol %), more preferably from 94/6 to 70/30 (mol %/mol %), and even more preferably from 89/10 to 81/19 (mol %/mol %). When the content of the 3-hydroxybutyrate units is 97 mol % or less, sufficient mechanical properties are likely to be achieved. When the content of the 3-hydroxybutyrate units is 70% or more, the crystallization speed of the resin is likely to be high, and a practically suitable solidification speed is likely to be achieved.

Examples of the other monomer include hydroxyalkanoates such as 3-hydroxyhexanoate (sometimes referred to as 3HH hereinafter) and 4-hydroxybutyrate (sometimes referred to as 4HB hereinafter).

The average content ratio between the monomer units in the total polyhydroxyalkanoate resin component can be determined by any method known to those skilled in the art, such as a method described in paragraph [0047] of WO 2013/147139. The average content ratio refers to the molar ratio between the 3-hydroxybutyrate units and the other monomer units contained in the total polyhydroxyalkanoate resin component. In the case where the polyhydroxyalkanoate resin component is a mixture of two or more polyhydroxyalkanoate resins, the average content ratio refers to the molar ratio between the monomer units contained in the total mixture.

The weight-average molecular weight of the polyhydroxyalkanoate resin component is not limited to a particular range. The weight-average molecular weight is preferably from $20 \times 10^4$ to $200 \times 10^4$, more preferably from $25 \times 10^4$ to $150 \times 10^4$, and even more preferably from $30 \times 10^4$ to $100 \times 10^4$. If the weight-average molecular weight is below $20 \times 10^4$, this is likely to lead to poor mechanical properties of the resulting polyhydroxyalkanoate resin composition. If the weight-average molecular weight is above $200 \times 10^4$, this is likely to lead to a high load imposed on the machinery used for melting and processing, resulting in low productivity.

In the case where the polyhydroxyalkanoate resin component is a mixture of two or more polyhydroxyalkanoate resins, the weight-average molecular weight of each polyhydroxyalkanoate resin is not limited to a particular range. For example, in the case where a high-crystallinity polyhydroxyalkanoate resin and a low-crystallinity polyhydroxyalkanoate resin are blended as described below, the weight-average molecular weight of the high-crystallinity polyhydroxyalkanoate resin is preferably from $20 \times 10^4$ to $100 \times 10^4$, more preferably from $22 \times 10^4$ to $80 \times 10^4$, and even more preferably from $25 \times 10^4$ to $60 \times 10^4$. If the weight-average molecular weight of the high-crystallinity polyhydroxyalkanoate resin is below $20 \times 10^4$, this is likely to lead to poor mechanical properties of the resulting polyhydroxyalkanoate resin composition. If the weight-average molecular weight is above $100 \times 10^4$, this is likely to lead to a failure to achieve a sufficient crystallization speed, resulting in reduced processability. The weight-average molecular weight of the low-crystallinity polyhydroxyalkanoate resin is preferably from $20 \times 10^4$ to $250 \times 10^4$, more preferably from $25 \times 10^4$ to $230 \times 10^4$, and even more preferably from $30 \times 10^4$ to $200 \times 10^4$. If the weight-average molecular weight of the low-crystallinity polyhydroxyalkanoate resin is below $20 \times 10^4$, this is likely to lead to poor mechanical properties of the resulting polyhydroxyalkanoate resin composition. if the weight-average molecular weight is above $250 \times 10^4$, this is likely to lead to a high load imposed on the machinery used for melting and processing, resulting in low productivity.

The weight-average molecular weight of the polyhydroxyalkanoate resin or resin component can be measured as a polystyrene-equivalent molecular weight by gel permeation chromatography (HPLC GPC system manufactured by Shimadzu Corporation) using a chloroform solution of the resin or resin component. The column used in the gel permeation chromatography may be any column suitable for weight-average molecular weight measurement.

The method of producing the polyhydroxyalkanoate resin is not limited to a particular technique, and may be a chemical synthesis production method or a microbial production method. A microbial production method is more preferred. The microbial production method used can be any known method. Known examples of bacteria that produce copolymers of 3-hydroxybutyrate and other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y Doi, *J. Bateriol.*, 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable polyhydroxyalkanoate resin synthesis-related gene introduced may be used depending on the polyhydroxyalkanoate resin to be produced. The culture conditions including the type of the substrate may be optimized depending on the polyhydroxyalkanoate resin to be produced.

(Additional Resin)

The polyhydroxyalkanoate resin composition of the present invention may contain an additional resin in addition to the polyhydroxyalkanoate resin component so long as the additional resin does not impair the effect of the present invention. Examples of the additional resin include: aliphatic polyester resins such as polybutylene succinate adipate, polybutylene succinate, polycaprolactone, and polylactic acid; and aliphatic-aromatic polyester resins such as polybutylene adipate terephthalate, polybutylene sebacate terephthalate, and polybutylene azelate terephthalate. The polyhydroxyalkanoate resin composition may contain one additional resin or two or more additional resins.

The content of the additional resin is not limited to a particular range, but is preferably 30 parts by weight or less and more preferably 20 parts by weight or less per 100 parts by weight of the polyhydroxyalkanoate resin component. The lower limit of the content of the additional resin is not limited to a particular value, and the content of the additional resin may be 0 parts by weight.

(Silica)

Preferably, the polyhydroxyalkanoate resin composition of the present invention further contains silica in order to obtain an improving effect on the mechanical properties such as tearing resistance.

The silica is not limited to a particular type. In terms of usability, synthetic amorphous silica produced by a dry or wet process is preferred. Either hydrophobized or hydrophilized silica may be used. One type of silica may be used alone, or two or more types of silica may be used in combination.

The silica preferably has an adsorbed moisture content of 0.5 to 7% by weight. The adsorbed moisture content can be determined as the percentage of weight loss arising from evaporation at 160° C. and measured, for example, by using MX-50, an electromagnetic balance manufactured by Kensei Kogyo Co., Ltd. If the adsorbed moisture content is above 7% by weight, the silica particles could be difficult to disperse because of cohesion of the moisture adsorbed on the surfaces of the silica particles and between the particles and could, during film formation, be aggregated into fish eyes which cause appearance defects. If the adsorbed moisture content is below 0.5% by weight, the slight amount of moisture remaining between the particles is likely to form bridging liquid membranes which produce strong bonding forces by surface tension, making separation between and dispersion of the particles extremely difficult.

The average primary particle size of the silica is not limited to a particular range and may be in any range so long as the silica provides an improvement in the tearing resistance of a film or sheet, is not likely to cause appearance defects such as fish eyes in the film or sheet, and does not significantly reduce the transparency of the film or sheet. In order to reliably obtain an improving effect on the mechanical properties such as tearing resistance and ensure high transparency, the average primary particle size is preferably from 0.001 to 0.1 μm and particularly preferably from 0.005 to 0.05 μm. The average primary particle size can be determined as an arithmetic mean of the sizes of any 50 or more primary particles observed using a transmission electron microscope (TEM).

The silica content (total silica content) is preferably from 1 to 12 parts by weight per 100 parts by weight of the total amount of the polyhydroxyalkanoate resin component. If the silica content is below 1 part by weight, the addition of the silica could, in the composite of the polyhydroxyalkanoate resin component and the silica, fail to offer a sufficient level of improving effect on the mechanical properties such as tearing resistance. If the silica content is above 12 parts by weight, the silica could be difficult to disperse well. The silica content is more preferably 2 parts by weight or more and even more preferably 4 parts by weight or more. The silica content is more preferably 11 parts by weight or less and even more preferably 10 parts by weight or less.

In the present invention, the silica and a dispersion aid are preferably used in combination in order to increase the dispersibility of the silica.

Examples of the dispersion aid include glycerin ester compounds, adipic ester compounds, polyether ester compounds, phthalic ester compounds, isosorbide ester compounds, and polycaprolactone compounds. Among these, the following compounds are preferred because they have high affinity for the resin component and are less likely to bleed out of the composition: modified glycerin compounds such as glycerin diacetomonolaurate, glycerin diacetomonocaprylate, and glycerin diacetomonodecanoate; adipic ester compounds such as diethylhexyl adipate, dioctyl adipate, and diisononyl adipate; and polyether ester compounds such as polyethylene glycol dibenzoate, polyethylene glycol dicaprylate, and polyethylene glycol diisostearate. Dispersion aids containing a large amount of biomass-derived component are particularly preferred in order to increase the overall biomass degree of the composition. Examples of such dispersion aids include RIKEMAL™ PL series of Riken Vitamin Co., Ltd. and Polysorb series of Roquette Frères. One dispersion aid may be used alone, or two or more dispersion aids may be used in combination.

The dispersion aid content (total dispersion aid content) is preferably from 0.1 to 20 parts by weight per 100 parts by weight of the total amount of the polyhydroxyalkanoate resin component. If the dispersion aid content is below 0.1 parts by weight, the dispersion aid could fail to satisfactorily perform the function of allowing the silica to be dispersed well, or the addition of the silica could, in the composite of the polyhydroxyalkanoate resin component, silica, and dispersion aid, fail to offer a sufficient level of improving effect on the mechanical properties such as tearing resistance. If the dispersion aid content is above 20 parts by weight, the dispersion aid could cause bleed-out. The dispersion aid content is more preferably 0.3 parts by weight or more and even more preferably 0.5 parts by weight or more. The dispersion aid content is more preferably 10 parts by weight or less and even more preferably 5 parts by weight or less.

(Additives)

The polyhydroxyalkanoate resin composition of the present invention may contain an additive so long as the additive does not impair the effect of the present invention. Examples of the additive include a crystal nucleating agent, a lubricant, a plasticizer, an antistatic, a flame retardant, a conductive additive, a heat insulator, a cross-linker, an antioxidant, an ultraviolet absorber, a colorant, an inorganic filler, an organic filler, and a hydrolysis inhibitor, and these additives can be used depending on the intended purpose. Biodegradable additives are particularly preferred.

Examples of the crystal nucleating agent include pentaerythritol, orotic acid, aspartame, cyanuric acid, glycine, zinc phenylphosphonate, and boron nitride. Among these, pentaerythritol is preferred because it is particularly superior in the accelerating effect on crystallization of the polyhydroxyalkanoate resin component. The amount of the crystal nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the polyhydroxyalkanoate resin component. One crystal nucleating agent may be used alone, or a mixture of two or more crystal nucleating agents may be used. The proportions of the crystal nucleating agents in the mixture may be adjusted as appropriate depending on the intended purpose.

Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislaurylamide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the polyhydroxyalkanoate resin component. The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the polyhydroxyalkanoate resin component. One lubricant may be used alone, or a mixture of two or more lubricants may be used. The proportions of the lubricants in the mixture can be adjusted as appropriate depending on the intended purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred because they are particularly superior in the plasticizing effect on the polyhydroxyalkanoate resin component. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not limited to a particular range, but is preferably from 1 to 20 parts by weight, more preferably from 2 to 15 parts by weight, and even more preferably from 3 to 10 parts by weight per 100 parts by weight of the polyhydroxyalkanoate resin component. One plasticizer may be used alone, or a mixture of two or more plasticizers may be used. The proportions of the plasticizers in the mixture can be adjusted as appropriate depending on the intended purpose.

(Melting Behavior of Composition)

The polyhydroxyalkanoate resin composition of the present invention exhibits a highest melting peak temperature of 130° C. or higher when subjected to differential scanning calorimetry. The polyhydroxyalkanoate resin composition meeting this requirement can be quickly solidified into a crystalline solid and thus exhibit high processability. The highest melting peak temperature is preferably from 130 to 165° C. and more preferably from 130 to 155° C.

The highest melting peak temperature exhibited by the polyhydroxyalkanoate resin composition is measured in differential scanning calorimetry which uses a differential scanning calorimeter (DSC25 manufactured by TA Instruments) and in which about 2 mg of the polyhydroxyalkanoate resin composition is heated from −30 to 180° C. at a rate of 10° C./min. In the DSC curve obtained by the calorimetry, the temperature at which the apex of the melting peak appearing in the highest temperature range among all melting peaks is located is the "highest melting peak temperature".

As illustrated in the DSC curve of the FIGURE, the polyhydroxyalkanoate resin composition of the present invention may exhibit, in addition to the highest-temperature melting peak, another melting peak in a temperature range below the temperature range where the highest-temperature melting peak appears. For example, the polyhydroxyalkanoate resin composition of the present invention may exhibit a melting peak in a temperature range up to 100° C.

Additionally, the polyhydroxyalkanoate resin composition of the present invention exhibits a total crystalline melting enthalpy of 20 to 65 J/g when subjected to differential scanning calorimetry. The total crystalline melting enthalpy is calculated from all the melting peaks. With the total crystalline melting enthalpy in the above range, the mechanical properties such as tearing resistance of a film processed from the polyhydroxyalkanoate resin composition can be improved. The total crystalline melting enthalpy is preferably from 23 to 60 J/g and particularly preferably from 25 to 55 J/g.

The total crystalline melting enthalpy calculated from all the melting peaks refers to the sum of the crystalline melting enthalpies associated respectively with the melting peaks. Specifically, in the DSC curve obtained as described above, baselines observed before the onset of melting and after the end of melting are connected by a straight line, and the area of the melting region (the hatched region in the FIGURE) defined by the straight line and the DSC curve is calculated as the total crystalline melting enthalpy.

(Method of Producing Composition)

Examples of the method of producing the polyhydroxyalkanoate resin composition of the present invention which exhibits the melting behavior as described above include: a method in which the polyhydroxyalkanoate resin used is a copolymer and in which the proportions of the monomers for forming the copolymer are adjusted as appropriate; a method in which a component other than the polyhydroxyalkanoate resin component, such as a plasticizer, is mixed with the resin component; and a method in which at least two polyhydroxyalkanoate resins differing in melting behavior are mixed. Particularly preferred is the method in which at least two polyhydroxyalkanoate resins differing in melting behavior are mixed. Specifically, it is preferable to mix at least two polyhydroxyalkanoate resins each of which exhibits a crystalline melting enthalpy different from that (those) of the other polyhydroxyalkanoate resin(s). In this case, the highest melting peak temperature in differential scanning calorimetry of the polyhydroxyalkanoate resin composition can easily be adjusted to 130° C. or higher, and the total crystalline melting enthalpy calculated from all the melting peaks can easily be adjusted in the range of 20 to 65 J/g.

In the case where at least two polyhydroxyalkanoate resins are mixed, the resins to be mixed preferably include a combination of at least one high-crystallinity polyhydroxyalkanoate resin and at least one low-crystallinity polyhydroxyalkanoate resin. In general, a high-crystallinity polyhydroxyalkanoate resin has high processability, but has low mechanical strength, while a low-crystallinity polyhydroxyalkanoate resin has good mechanical properties although having low processability. The combined use of these resins can result in a polyhydroxyalkanoate resin composition having both high processability and good mechanical properties.

In the case where the high-crystallinity polyhydroxyalkanoate resin contains 3-hydroxybutyrate structural units, the average content of the 3-hydroxybutyrate structural units in the high-crystallinity polyhydroxyalkanoate resin is preferably higher than the average content of 3-hydroxybutyrate structural units in the total polyhydroxyalkanoate resin component. In the case where the high-crystallinity polyhydroxyalkanoate resin contains not only 3-hydroxybutyrate units but also other monomer units, the average content ratio between the 3-hydroxybutyrate units and the other monomer units (3-hydroxybutyrate units/other monomer units) in the high-crystallinity resin is preferably from 90/10 to 99/1 (mol %/mol %).

Poly(3-hydroxybutyrate-co-3-hydroxyhexanoate) or poly (3-hydroxybutyrate-co-4-hydroxybutyrate) is preferred as the high-crystallinity polyhydroxyalkanoate resin component. In the case where the high-crystallinity polyhydroxyalkanoate resin is poly(3-hydroxybutyrate-co-3-hydroxyhexanoate), the average content of 3-hydroxyhexanoate structural units in the resin is preferably from 1 to 6 mol %.

In the case where the polyhydroxyalkanoate resin component of the polyhydroxyalkanoate resin composition of the present invention contains 3-hydroxybutyrate structural units, the average content of 3-hydroxybutyrate structural units in the low-crystallinity polyhydroxyalkanoate resin is preferably lower than the average content of 3-hydroxybutyrate structural units in the total polyhydroxyalkanoate resin component. In the case where the low-crystallinity polyhydroxyalkanoate resin contains 3-hydroxybutyrate units and other monomer units, the average content ratio between the 3-hydroxybutyrate units and the other monomer units (3-hydroxybutyrate units/other monomer units) in the low-crystallinity resin is preferably from 80/20 to 0/100 (mol %/mol %).

Poly(3-hydroxybutyrate-co-3-hydroxyhexanoate) or poly (3-hydroxybutyrate-co-4-hydroxybutyrate) is preferred as the low-crystallinity polyhydroxyalkanoate resin. In the case where the low-crystallinity polyhydroxyalkanoate resin is poly(3-hydroxybutyrate-co-3-hydroxyhexanoate), the average content of the 3-hydroxyhexanoate structural units in the resin is preferably from 24 to 100 mol %, more preferably from 24 to 99 mol %, and even more preferably from 24 to 50 mol %.

In the case where the high-crystallinity and low-crystallinity polyhydroxyalkanoate resins as described above are used in combination, the proportions of the resins in the mixture are not limited to particular ranges. Preferably, the proportion of the high-crystallinity polyhydroxyalkanoate resin is from 35 to 80% by weight, and the proportion of the low-crystallinity polyhydroxyalkanoate resin is from 20 to 65% by weight.

The method of blending two or more polyhydroxyalkanoate resins is not limited to a particular technique, and may be a method in which the blend is obtained by microbial production or a method in which the blend is obtained by chemical synthesis. Alternatively, the blend may be obtained by melting and kneading the two or more resins using an extruder, a kneader, a Banbury mixer, or a roll machine or by dissolving the two or more resins in a solvent, mixing the resins in the solution, and drying the solution.

[Molded Body]

The polyhydroxyalkanoate resin composition of the present invention can be processed into a molded body by any of various forming methods such as extrusion molding, injection molding, and calendering.

The process of forming the polyhydroxyalkanoate resin composition of the present invention into a film or sheet can be accomplished using a known method such as an inflation method or a T-die extrusion method. The details of the conditions may be set as appropriate. In the inflation method, for example, it is preferable to dry pellets of the composition to a moisture content of 500 ppm or less by means such as a dehumidification dryer before inflation molding and set the cylinder to a temperature of 100 to 160° C. and the adapter and die to a temperature of 130 to 160° C.

The polyhydroxyalkanoate resin composition of the present invention can be processed into a film or sheet that exhibits high tearing resistance. The tearing resistance refers to an Elmendorf tearing resistance. The film or sheet is tested for tearing resistance in MD and TD directions using a light load-type tearing tester (NO. 2037 special model, manufactured by Kumagai Riki Kogyo Co., Ltd.) having a function and structure conforming with those of a standard Elmendorf tearing tester as specified in JIS P-8116. Each measurement value is divided by the thickness of the film or sheet, and the resulting value is adopted as the Elmendorf tearing resistance.

The thickness of the film or sheet is not limited to a particular range. In general, the thickness of what may be called a "film" is from about 1 to 100 μm, and the thickness of what may be called a "sheet" is more than 100 μm and up to about 2 mm.

The film or sheet of the present invention has high biodegradability and is thus suitable for use in various fields such as agricultural industry, fishery industry, forestry industry, horticultural industry, medical industry, hygiene industry, food industry, apparel industry, non-apparel industry, packaging industry, automotive industry, building material industry, and various other industries. For example, the film or sheet can be used in various products such as garbage bags, checkout bags, packaging bags for vegetables and fruits, multi-purpose films for agriculture, fumigation sheets for forestry, binding tapes containing flat yarns, root wrapping films for garden plants, back sheets for diapers, sheets for packaging, shopping bags, draining bags, and compost bags.

EXAMPLES

Hereinafter, the present invention will be specifically described using examples. The technical scope of the present invention is not limited by the examples described below.

The following describes the materials used in Examples and Comparative Examples.

[Polyhydroxyalkanoate Resins]

P3HB3HH-1: P3HB3HH (average content ratio 3HB/ 3HH=94/6 (mol %/mol %), weight-average molecular weight=40×10⁴ g/mol)

This resin was produced according to the method described in Example 1 of WO 2019/142845.

P3HB3HH-2: P3HB3HH (average content ratio 3HB/ 3HH=72/28 (mol %/mol %), weight-average molecular weight=100×10⁴ g/mol)

This resin was produced according to the method described in Example 9 of WO 2019/142845.

P3HB3HH-3: P3HB3HH (average content ratio 3HB/ 3HH=75/25 (mol %/mol %), weight-average molecular weight=100×10⁴ g/mol)

This resin was produced according to the method described in Example 6 of WO 2019/142845.

P3HB3HH-4: P3HB3HH (average content ratio 3HB/ 3HH=83/17 (mol %/mol %), weight-average molecular weight=70×10⁴ g/mol)

This resin was produced according to the method described in Example 7 of WO 2019/142845

P3HB4HB: P3HB4HB (I6002 manufactured by Metabolix Inc.; average content ratio 3HB/4HB=55/45 (mol %/mol %), weight-average molecular weight=23×10⁴ g/mol)

For the case where a mixture of two or more resins was used as the polyhydroxyalkanoate resin component, the value of average content ratio (3HB/comonomer) shown in Table 1 is an average value calculated from the average content ratio 3HB/comonomer in each resin and the proportion by weight of each resin. The "comonomer" refers to 3HH for P3HB3HH and 4HB for P3HB4HB. For Examples 9, 10, 13, 14, 17, and 18 where a mixture of P3HB3HH and P3HB4HB was used, the "comonomer" refers to both 3HH and 4HB.

[Silica]

B-1: Nipsil LP (wet silica, manufactured by Tosoh Silica Corporation)

This silica has an average primary particle size of 16 nm and an adsorbed moisture content of 4% by weight (values indicated in a catalog provided by the manufacturer).

[Dispersion Aid]

RIKEMAL: PL-012 (glycerin ester compound, manufactured by Riken Vitamin Co., Ltd)

[Additives]

Additive-1: Pentaerythritol (Neulizer P, manufactured by Mitsubishi Chemical Corporation)

Additive-2: Behenamide (BNT-22H, manufactured by Nippon Fine Chemical Co., Ltd.)

Additive-3: Erucamide (NEUTRON-S, manufactured by Nippon Fine Chemical Co., Ltd.)

Methods used for evaluation in Examples and Comparative Examples will now be described.

[Measurement of Melting Peak Temperature and Crystalline Melting Enthalpy in Differential Scanning Calorimetry]

About 2 mg of each of the polyhydroxyalkanoate resin compositions obtained in Examples and Comparative Examples was weighed and subjected to differential scanning calorimetry which used a differential scanning calorimeter (DSC25 manufactured by TA Instruments) and in which the composition was heated from −30 to 180° C. at a rate of 10° C./min. In the DSC curve obtained by the calorimetry, the temperature was determined at which the apex of the melting peak detected in the highest temperature range among all melting peaks was located. Additionally, in the DSC curve, baselines observed before the onset of melting and after the end of melting were connected by a straight line, and the total amount of heat calculated as the area of the melting region defined by the straight line and the DSC curve was determined as the total crystalline melting enthalpy. The DSC curve obtained for the polyhydroxyalkanoate resin composition of Example 4 is shown in the FIGURE.

[Evaluation of Tearing Resistance]

Production of Film

A PET film (thickness=50 μm) having one surface subjected to mold release treatment was placed on a 2-mm-thick SUS plate (30 cm×35 cm) in a position where the treated surface faced away from the SUS plate, and 1.3 g of resin composition pellets were placed on the PET film. A 70-μm-thick shim plate was placed as a spacer to surround the resin composition pellets. After that, a plate identical to the above SUS plate was placed to sandwich the resin composition pellets. The sandwiched pellets were placed on the hot press plate of a press machine (Compression Molding Machine NSF-50, manufactured by Sinto Metal Industries, Ltd.) which was heated to 160° C., and were preheated for 5 minutes. After the preheating, the pressure was slowly increased to 5 MPa over 2 minutes, and the increased pressure was maintained for 2 minutes. The pressing was followed by cooling to a room temperature on a cooling plate cooled to about 20° C., and thus an about 50-μm-thick film was obtained. This film was aged at a room temperature of 23° C. and a humidity of 50% for 1 week, and the resulting film was used as a film sample.

Measurement of Tearing Resistance

The film sample was tested using a light load-type tearing tester (NO. 2037 special model, manufactured by Kumagai Riki Kogyo Co., Ltd.) having a function and structure conforming with those of a standard Elmendorf tearing tester as specified in JIS P-8116, and the measurement value was divided by the thickness of the film sample. The resulting value was adopted as the Elmendorf tearing resistance of the film sample.

[Evaluation of Processability]

About 4.5 g of the sample material was kneaded for 5 minutes using a small-sized kneader (DSM Xplore 5, model 2005, manufactured by DSM) at a barrel temperature of 170° C. and a screw rotational speed of 100 rpm. After that, the resin composition was discharged through a die and immediately introduced into a water bath heated to 60° C., and the time taken for solidification of the composition into a crystalline solid was measured. In the case where the composition was solidified within 100 seconds, the composition was rated as having good processability.

Example 1

1.09 g of P3HB3HH-1, 3.41 g of P3HB3HH-2, 0.045 g of additive-1, 0.0225 g of additive-2, and 0.0225 g of additive-3 were placed into a small-sized kneader (DSM Xplore 5, model 2005, manufactured by DSM) and kneaded at a barrel temperature of 170° C. and a screw rotational speed of 100 rpm for 5 minutes. Immediately after the kneading, the molten resin composition in the shape of a strand was discharged through a die and introduced into a water bath heated to 60° C. The processability thus evaluated was good. After that, the strand solidified into a crystalline solid in the water bath was cut into resin composition pellets by a nipper.

A film was produced from the resin composition pellets using a press machine and aged for 1 week, after which the tearing resistance of the film was measured. The measured tearing resistance was 5.1 N/mm. The results of the evaluation of the processability and tearing resistance are shown in Table 2. Additionally, the resin composition pellets were aged for 1 week, and then the melting peak temperature and total crystalline melting enthalpy of the pellets were measured by differential scanning calorimetry. The measured melting peak temperature was 142.8° C., and the measured total crystalline melting enthalpy was 50 J/g. These results are also shown in Table 2.

Examples 2 to 10 and Comparative Examples 1 to 4

Resin composition pellets were produced and evaluated in the same manner as in Example 1, except that the proportions of the materials were changed as shown in Table 1. The results are collectively shown in Table 2.

Examples 11 to 14

Resin composition pellets were produced and evaluated in the same manner as in Examples 7 to 10, except that 5 parts by weight of the silica was placed into the small-sized kneader per 100 parts by weight of the total amount of the resins. The results are collectively shown in Table 2.

Examples 15 to 18

Resin composition pellets were produced and evaluated in the same manner as in Examples 7 to 10, except that 5 parts by weight of the silica and 1 part by weight of the dispersion aid were placed into the small-sized kneader per 100 parts by weight of the total amount of the resins. The results are collectively shown in Table 2.

TABLE 1

| | Polyhydroxyalkanoate resin | | | | | | Additive | | | Silica/dispersion aid |
| | Amount (% by weight) | | | | | Average content ratio 3HB/comonomer | Amount (parts by weight*) | | | Amount (parts by weight*) |
| | P3HB3HH-1 | P3HB3HH-2 | P3HB3HH-3 | P3HB4HB | P3HB3HH-4 | | Additive-1 | Additive-2 | Additive-3 | |
|---|---|---|---|---|---|---|---|---|---|---|
| Example 1 | 75.8 | 24.2 | | | | 89/11 | 1.0 | 0.5 | 0.5 | |
| Example 2 | 62.4 | 37.6 | | | | 86/14 | 1.0 | 0.5 | 0.5 | |
| Example 3 | 56.3 | 43.7 | | | | 85/15 | 1.0 | 0.5 | 0.5 | |
| Example 4 | 53.3 | 46.7 | | | | 84/16 | 1.0 | 0.5 | 0.5 | |
| Example 5 | 48.3 | 51.7 | | | | 83/17 | 1.0 | 0.5 | 0.5 | |
| Example 6 | 43.8 | 56.2 | | | | 82/18 | 1.0 | 0.5 | 0.5 | |
| Example 7 | 48.6 | | 51.4 | | | 85/15 | 1.0 | 0.5 | 0.5 | |
| Example 8 | 38.6 | | 61.4 | | | 83/17 | 1.0 | 0.5 | 0.5 | |
| Example 9 | 60.0 | | | 40.0 | | 78/22 | 1.0 | 0.5 | 0.5 | |
| Example 10 | 50.0 | | | 50.0 | | 74/26 | 1.0 | 0.5 | 0.5 | |
| Comp. Example 1 | 100.0 | | | | | 94/6 | 1.0 | 0.5 | 0.5 | |
| Comp. Example 2 | | 100.0 | | | | 72/28 | 1.0 | 0.5 | 0.5 | |
| Comp. Example 3 | | | 100.0 | | | 75/25 | 1.0 | 0.5 | 0.5 | |
| Comp. Example 4 | | | | | 100 | 83/17 | 1.0 | 0.5 | 0.5 | |
| Example 11 | 48.6 | | 51.4 | | | 85/15 | 1.0 | 0.5 | 0.5 | 5/0 |
| Example 12 | 38.6 | | 61.4 | | | 83/17 | 1.0 | 0.5 | 0.5 | 5/0 |
| Example 13 | 60.0 | | | 40.0 | | 78/22 | 1.0 | 0.5 | 0.5 | 5/0 |
| Example 14 | 50.0 | | | 50.0 | | 74/26 | 1.0 | 0.5 | 0.5 | 5/0 |
| Example 15 | 48.6 | | 51.4 | | | 85/15 | 1.0 | 0.5 | 0.5 | 5/1 |
| Example 16 | 38.6 | | 61.4 | | | 83/17 | 1.0 | 0.5 | 0.5 | 5/1 |

TABLE 1-continued

| | Polyhydroxyalkanoate resin | | | | | | | | | Silica/ dispersion aid Amount (parts by weight*) |
| | Amount (% by weight) | | | | | Average content ratio 3HB/ comonomer | Additive Amount (parts by weight*) | | | |
| | P3HB3HH-1 | P3HB3HH-2 | P3HB3HH-3 | P3HB4HB | P3HB3HH-4 | | Additive-1 | Additive-2 | Additive-3 | |
|---|---|---|---|---|---|---|---|---|---|---|
| Example 17 | 60.0 | | | 40.0 | | 78/22 | 1.0 | 0.5 | 0.5 | 5/1 |
| Example 18 | 50.0 | | | 50.0 | | 74/26 | 1.0 | 0.5 | 0.5 | 5/1 |

*Parts by weight per 100 parts by weight of the total amount of the resins

TABLE 2

| | Highest melting temperature peak (° C.) | Total crystalline melting enthalpy (J/g) | Processability | Elmendorf tearing resistance (N/mm) |
|---|---|---|---|---|
| Example 1 | 142.8 | 50 | Good | 5.1 |
| Example 2 | 143.3 | 43 | Good | 8.5 |
| Example 3 | 143.1 | 40 | Good | 12.9 |
| Example 4 | 143.8 | 34 | Good | 16.8 |
| Example 5 | 143.1 | 32 | Good | 24.8 |
| Example 6 | 143.3 | 28 | Good | 52.0 |
| Example 7 | 143.2 | 37 | Good | 8.0 |
| Example 8 | 143.3 | 31 | Good | 42.0 |
| Example 9 | 142.9 | 39 | Good | 9.7 |
| Example 10 | 142.9 | 38 | Good | 43.2 |
| Comp. Example 1 | 142.1 | 68 | Good | 1.5 |
| Comp. Example 2 | 50.4 | 11 | Poor | 60.0 |
| Comp. Example 3 | 51.3 | 17 | Poor | 47.8 |
| Comp. Example 4 | 99.6 | 31 | Poor | 5.0 |
| Example 11 | 143.1 | 36 | Good | 12.0 |
| Example 12 | 143.4 | 30 | Good | 81.3 |
| Example 13 | 142.8 | 38 | Good | 12.6 |
| Example 14 | 142.9 | 37 | Good | 61.1 |
| Example 15 | 143.0 | 36 | Good | 19.7 |
| Example 16 | 143.3 | 30 | Good | 125.5 |
| Example 17 | 143.1 | 38 | Good | 19.2 |
| Example 18 | 143.2 | 37 | Good | 72.8 |

Table 2 reveals that the polyhydroxyalkanoate resin compositions obtained in Examples had good processability and that these compositions exhibited high values of tearing resistance and had good mechanical properties. In contrast, in Comparative Example 1, where the total crystalline melting enthalpy was as high as 68 J/g, the value of tearing resistance was low, and the mechanical properties were insufficient. In Comparative Examples 2 to 4, where the highest melting peak temperature was low, the solidification into a crystalline solid required a long time, and the processability was poor. Comparison between Examples 7 to 10 and Examples 11 to 14 leads to the conclusion that the addition of the silica further improved the tearing resistance. Comparison between Examples 7 to 10 and Examples 15 to 18 leads to the conclusion that the addition of the silica and dispersion aid further improved the tearing resistance.

The invention claimed is:

1. A polyhydroxyalkanoate resin composition, comprising: a polyhydroxyalkanoate resin component, wherein in differential scanning calorimetry of the polyhydroxyalkanoate resin composition, a highest melting peak temperature is at least 130° C., and a total crystalline melting enthalpy calculated from all melting peaks is from 20 to 65 J/g, wherein the polyhydroxyalkanoate resin component is a mixture of poly(3-hydroxybutyrate-co-3-hydroxyhexanoate) (A) comprising from 1 mol % to 6 mol % of 3-hydroxyhexanoate structural units and poly(3-hydroxybutyrate-co-3-hydroxyhexanoate) or poly(3-hydroxybutyrate-co-4-hydroxybutyrate) (B) comprising from 24 mol % to 45 mol % of 3-hydroxyhexanoate structural units or 4-hydroxybutyrate structural units, and in the mixture, a proportion of the poly(3-hydroxybutyrate-co-3-hydroxyhexanoate) (A) is from 35% by weight to 75.8% by weight, and a proportion of the poly(3-hydroxybutyrate-co-3-hydroxyhexanoate) or poly(3-hydroxybutyrate-co-4-hydroxybutyrate) (B) is from 24.2% by weight to 65% by weights wherein an average content ratio of 3-hydroxybutyrate units and other monomer units, 3-hydroxybutyrate units/other monomer units, in the total polyhydroxyalkanoate resin component is from 89/11 to 82/18 mol %/mol %, and wherein the Elmendorf tearing resistance is from 5.1 N/mm to 52.0 N/mm.

2. The polyhydroxyalkanoate resin composition according to claim 1, further comprising:
   from 1 to 12 parts by weight of silica per 100 parts by weight of a total amount of the polyhydroxyalkanoate resin component.

3. The polyhydroxyalkanoate resin composition according to claim 2, further comprising:
   from 0.1 to 20 parts by weight of a dispersion aid per 100 parts by weight of the total amount of the polyhydroxyalkanoate resin component.

4. A polyhydroxyalkanoate resin molded body, comprising:
   the polyhydroxyalkanoate resin composition according to claim 1.

5. A polyhydroxyalkanoate resin film or sheet, comprising:
   the polyhydroxyalkanoate resin composition according to claim 1.

6. The polyhydroxyalkanoate resin composition according to claim 1, further comprising:
   at least one additional resin selected from the group consisting of an aliphatic polyester resin and an aliphatic-aromatic polyester resin.

7. The polyhydroxyalkanoate resin composition according to claim 6, wherein a total amount of the additional resin is 30 parts by weight or less per 100 parts by weight of a total amount of the polyhydroxyalkanoate resin component.

8. The polyhydroxyalkanoate resin composition according to claim 2, wherein the silica has an average primary particle size of from 0.001 µm to 0.1 µm.

9. The polyhydroxyalkanoate resin composition according to claim 1, wherein in the differential scanning calorimetry of the polyhydroxyalkanoate resin composition, the highest melting peak temperature is from 130° C. to 165° C.

10. The polyhydroxyalkanoate resin composition according to claim 1, wherein in the differential scanning calorimetry of the polyhydroxyalkanoate resin composition, the total crystalline melting enthalpy calculated from all melting peaks is from 25 to 55 J/g.

11. A polyhydroxyalkanoate resin film, having a thickness of from 1 µm to 100 µm and comprising the polyhydroxyalkanoate resin composition according to claim 1.

12. A polyhydroxyalkanoate resin sheet, having a thickness of from greater than 100 µm to 2 mm, and comprising the polyhydroxyalkanoate resin composition according to claim 1.

13. The polyhydroxyalkanoate resin composition according to claim 1, wherein the mixture comprises the poly(3-hydroxybutyrate-co-3-hydroxyhexanoate) (B).

14. The polyhydroxyalkanoate resin composition according to claim 1, wherein the polyhydroxyalkanoate resin composition contains no aliphatic-aromatic polyester resins.

15. A polyhydroxyalkanoate resin composition, comprising:

a polyhydroxyalkanoate resin component, wherein in differential scanning calorimetry of the polyhydroxyalkanoate resin composition, a highest melting peak temperature is at least 130° C., and a total crystalline melting enthalpy calculated from all melting peaks is from 20 to 65 J/g, wherein the polyhydroxyalkanoate resin component is a mixture of poly(3-hydroxybutyrate-co-3-hydroxyhexanoate) (A) comprising from 1 mol % to 6 mol % of 3-hydroxyhexanoate structural units and poly(3-hydroxybutyrate-co-3-hydroxyhexanoate) or poly(3-hydroxybutyrate-co-4-hydroxybutyrate) (B) comprising from 24 mol % to 45 mol % of 3-hydroxyhexanoate structural units or 4-hydroxybutyrate structural units, and in the mixture, a proportion of the poly(3-hydroxybutyrate-co-3-hydroxyhexanoate) (A) is from 35% by weight to 80% by weight, and a proportion of the poly(3-hydroxybutyrate-co-3-hydroxyhexanoate) or poly(3-hydroxybutyrate-co-4-hydroxybutyrate) (B) is from 20% by weight to 65% by weight, wherein the polyhydroxyalkanoate resin composition contains no aliphatic-aromatic polyester resins.

* * * * *